March 6, 1956

J. S. HEISLER ET AL 2,737,461

PROCESS OF FORMING ADHERENT POLYETHYLENE
COATING ON METAL SURFACES

Filed Sept. 16, 1950

Jerome S. Heisler
Albert Heisler
Anthony J. Starr
INVENTORS

BY George W. Corey
ATTORNEY

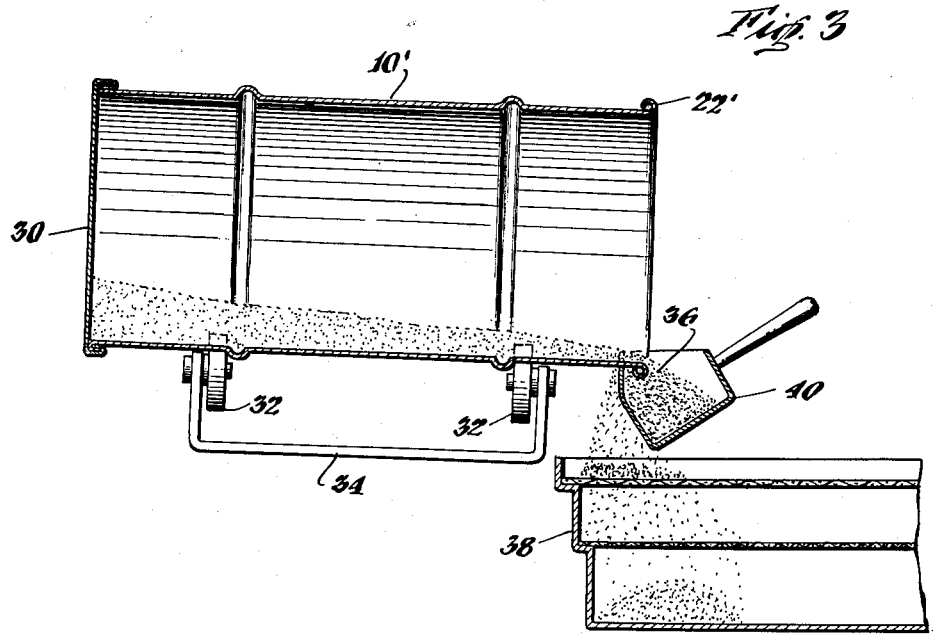
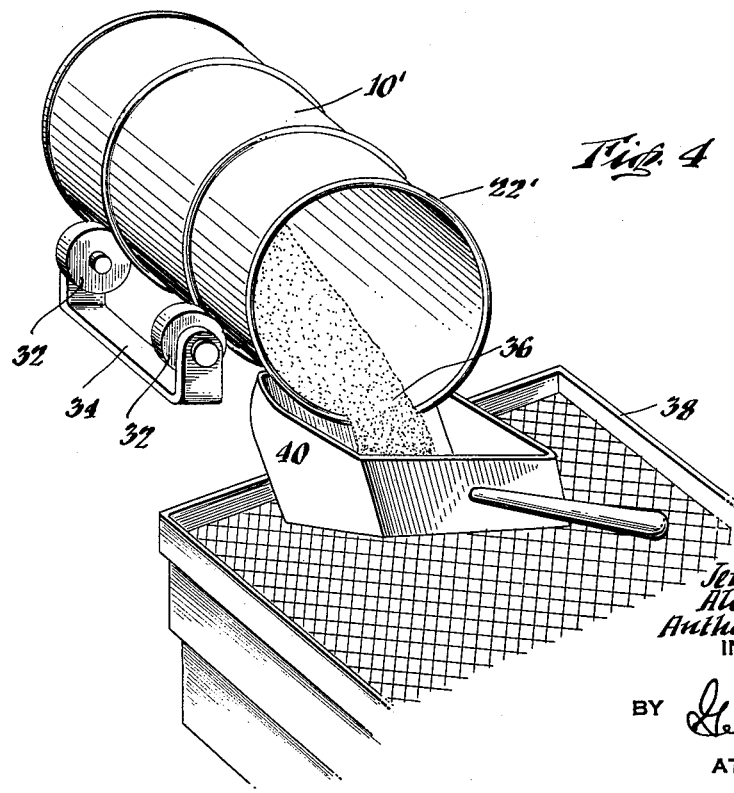

ered to the heated surface and the additional par-
United States Patent Office 2,737,461
Patented Mar. 6, 1956

2,737,461

PROCESS OF FORMING ADHERENT POLYETHYLENE COATING ON METAL SURFACES

Jerome S. Heisler, Albert Heisler, and Anthony J. Starr, Wilmington, Del., assignors, by mesne assignments, to Jerome S. Heisler and Albert Heisler, both of Wilmington, Del.

Application September 16, 1950, Serial No. 185,254

10 Claims. (Cl. 117—18)

This invention relates to a new and improved process of forming adherent protective coatings of normally solid polymers of ethylene on metal surfaces and to the coated metal articles produced thereby.

The normally solid polymers of ethylene, sometimes referred to as "polythenes," are known to have many interesting properties which commend them for use as protective coatings on metal surfaces, among them being their exceptional insolubility and inertness with respect to a wide variety of chemicals. They are also outstanding for their low water absorption and low rate of transmission of water vapor.

Because of their exceptional properties, various attempts have been made to utilize the polythenes in the form of coatings or linings for metal tanks and containers of various types, but heretofore no satisfactory relatively inexpensive method of applying such coatings or linings directly onto metal surfaces, and more particularly onto the interior surfaces of tanks, drums, pails and similar metal containers has been developed.

It has been proposed to bring about the desired adherence of polythene coatings or preformed polythene films by first applying to the metal surface a special adhesive composition designed to form a bond between the metal surface and an overlying layer of polythene applied in any one of various ways, such as by means of dispersion in a suitable solvent, a preformed sheet or film of the ethylene polymer or by troweling on to the adhesive coated surface a layer of solid particles of the ethylene polymer and thereafter by the application of heat and pressure causing the layer of solid particles to be molded or coalesced into a continuous impervious mass. These methods require a very considerable amount of hand labor and are time consuming and expensive.

It has also been proposed to form coatings of normally solid polymers of ethylene on metal surfaces by means of flame spraying, i. e., by feeding the polymer in the form of a powder to a "flame gun" in which the particles of the polymer are brought to a fused state and are transferred to the surface to be coated while they are in a fused state. This process suffers from the drawback that the temperature must be very closely controlled to prevent decomposition of the polymer and highly skilled labor is required for the manipulation of the flame gun. Moreover, the thickness of the film that can be formed in this manner is relatively thin, usually of the order of 1 to 2 mils in thickness, which experience has shown is insufficient to provide adequate protection of the metal surface for most purposes. The thickness of the sprayed coating can be built up by repeated applications each followed by a baking treatment, but this involves repeating the operation a sufficient number of times to insure the desired thickness and consequently increases the cost.

It has also been proposed to dissolve the ethylene polymer in various solvents, for example, benzene, toluene or xylene, and to apply the polymer in the form of a solution in such a solvent. This process requires a baking treatment to drive off the solvent and harden the coating. It also requires the use of a vapor condensing apparatus to recover the solvent. Here again the thickness of the ethylene polymer coating that can be formed in a single application is limited, so that repeated applications with intervening baking steps must be employed to build up the thickness of the coating to a sufficient extent.

We have found that it is possible to form continuous adherent protective coatings on metal surfaces by direct application of normally solid ethylene polymers in the form of a powder, and that a coating of a thickness adequate to protect against undesired penetration by moisture and satisfactorily resistant to any of a wide variety of chemicals may be built up in a single coating operation. Depending upon the thickness or mass of the metal body or article that is to be coated, coatings having a thickness of from 8 to 30 mils may be produced in a single coating operation. The process also permits of the application of a series of coatings which may each be relatively thick as compared with the coatings produced by methods previously described.

The surface contour of the metal surface does not present any insurmountable handicap to the production of a satisfactory coating, and in fact, the invention has been carried out on a commercial scale in an entirely practical manner in producing coatings on the interior surfaces of steel drums and pails, including the slightly recessed surfaces at the junction of the bottom and side walls of various types of drums and pails and the annular recesses at the rolling hoops of certain types of drums. In the ensuing description the invention will be described in its presently preferred form as applied in the production of coatings on the interior surfaces of steel drums and pails.

It is a further object of our invention to provide a process which lends itself to large scale or mass production operations in the coating of a wide variety of metal articles with polyethylene and which is relatively inexpensive to practice, requires simple forms of equipment and which imposes only moderate requirements as regards labor and supervision.

It is a still further and more specific object of our invention to provide a process which may be applied in coating the interior surfaces of various types of steel drums, including both the closed-end and open-end types, as well as tanks, pails and metal containers of various kinds.

It is still another object of the invention to provide a process which may be applied in coating the heads of closed-end types of steel drums prior to their assembly with the bodies of the drums so that when a head is assembled with the drum body and secured in the conventional way a satisfactory sealing of the interior surfaces of the drum against access thereto of the contents is assured. Other objects will appear hereinafter.

The above objects are accomplished according to our invention by applying a normally solid ethylene polymer in the form of powder to the metal surface to be coated while the surface is in a preheated condition, the degree of preheat being regulated within the range which will insure softening and surface fusion of the solid ethylene polymer particles brought into contact therewith and which, at the same time, will not cause charring or other decomposition of the ethylene polymer, and, as the polymer particles fuse and adhere to the preheated metal surface, causing additional particles of the solid polymer to be brought into contact with the fused polymer on the heated surface under conditions insuring rapid heat transfer between such heated surface and the additional particles of polymer. This operation is continued until the desired thickness of coating has been formed or until the metal has cooled to the point where further fusion of the solid particles brought into contact therewith or with the previously formed coating will no longer take place. It is a further feature of the invention to provide a quantity of the ethylene polymer powder in and adjacent the zone of rapid heat transference that is substantially in excess of the amount required to insure the predetermined thickness of coating. The coating operation is also carried on under conditions which insure access of air to the coated surface under the temperature conditions prevailing in that zone so that more or less hardening or baking of the coating takes place as the fusion of additional solid particles upon the coated surface is proceeding. When the desired thickness of coating has been developed or the temperature has dropped to a temperature where further building up of the coating will not take place without reheating of the metal surface, the article is separated from the excess of ethylene polymer powder and thereafter subjected to a baking treatment to conclude the hardening of the coating. The article is preferably subjected to an accelerated cooling on conclusion of the baking treatment. Further particulars of the conditions to be observed at the various stages of the process are set forth hereinafter in the detailed description.

In the accompanying drawing Fig. 1 is a diagrammatic representation or flow sheet outlining the successive steps of the process as carried out in a typical application involving the reconditioning and coating of used steel drums;

Fig. 3 is a part side elevation and part section, and Fig. 4 is a perspective view of a roller assembly with a steel drum closed at one end supported thereon for rotation during the course of the coating operation.

Figure 1:
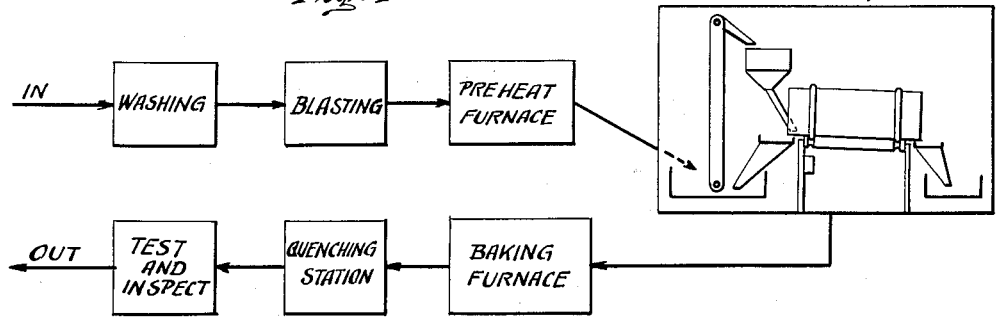

More particularly, we have found that in order to be successful in forming an adherent, impermeable and chemically resistant polyethylene coating on metal surfaces by applying normally solid ethylene polymers in powder form, it is necessary to follow out a carefully controlled procedure including the following precautionary measures and process steps:

1. *Condition of the metal surface.*—The metal surface must be clean and free from oxide scale. If it is not originally in such state it should be subjected to an appropriate cleaning treatment as by pickling, degreasing, sand or shot blasting. We find that it is preferable and improves the adherence of the coating to subject the clean surface to a mild blasting with sand, shot or metal grits so as to bring about a slight roughening of the surface.

2. *Preliminary heating of the metal surface.*—The clean and preferably slightly roughened sheet or other metal shape to be coated is heated preliminary to the coating operation to a temperature sufficient to insure that the temperature at the surface undergoing coating has been brought to and will remain during the course of the building up of the desired thickness of coating at a temperature above the fusing point of the ethylene polymer employed. At the same time, the temperature should not be so high as to cause charring or other undesired decomposition of the polymer.

The optimum temperature to which the sheet or other metal shape should be brought will vary somewhat depending upon the thickness of the sheet or the cross-section if a metal shape other than a sheet is involved, and also upon the thickness of the coating that it is desired to form in the course of a single coating treatment. Some experimentation to determine the optimum temperature may be required when initiating coating of articles whose metal mass is of irregular thickness or otherwise does not conform with previous experience. The essential thing that must be borne in mind is that sufficient heat must be stored in or applied to the metal article or body to maintain the temperature of the surface undergoing coating and also the portions of polyethylene that have become fused and welded thereto in the course of the treatment at a point above the fusing point of the ethylene polymer so that additional particles of the polymer brought to the surface of the previous fused layer of ethylene polymer under the conditions in which the powder is applied, as more particularly hereinafter described, are caused to fuse and become a part of the coating, all while avoiding such a high temperature as to bring about charring or degradation of the polymer or a condition of free fluidity of the fused layer of ethylene polymer. In practicing the process in the coating of the interior surfaces of steel drums, pails and similar containers formed of sheet steel varying in thickness from 12 to 18 gauge, we find that satisfactory results are obtained by heating the drum or other sheet steel article until it has attained a uniform temperature within the range 350°–475° F. and then immediately while heated to such temperature beginning the application of the ethylene polymer powder to the surfaces to be coated.

The thickness or cross-sectional dimension or mass of the article being coated may impose a limit on the thickness of the coating that may be built up in a single application. For example, where relatively thin gauge sheet metal is to be given a relatively thick coating, it may be necessary to repeat the preheating and coating operations. To be specific, if the article is formed of sheet metal of 18 gauge or thinner, and it is desired to form a relatively thick coating, say of the order of 20 mils thickness, the amount of heat that may be stored in the metal in the course of the preheating treatment will ordinarily be insufficient to make it possible to develop the desired thickness of coating in a single operation. However, it is entirely practical, after the maximum possible thickness of coating has been developed in the initial coating step and this coating has been baked, to reheat the article until the metal and the coating thereon have been brought to the desired degree of preheating, care being taken not to raise the temperature to the point where charring of the coating will result or the coating becomes freely molten and will run off the sides or other inclined surfaces of the article being coated, whereupon a further application of solid polymer particles may be made to complete the building up of the coating to the desired final thickness. In coating sheet metal articles of greater thickness than 18 gauge, generally no problem is presented in developing coatings of from 8 to 15 mils thickness in a single coating operation by following the procedure described herein.

3. *Application of the ethylene polymer powder.*—Our experience has shown that the conditions maintained during the application of the polyethylene powder are extremely important from the standpoint of insuring a satisfactory result. Besides the factor of temperature above discussed, we find that the formation and building up of the coating on the heated surface requires special precautions. Merely covering the heated surface with a quantity of the powder calculated to produce the desired thickness of coating and then allowing the surface to cool will not insure a satisfactory result. We find that it is necessary to apply the powder in such a way as positively to insure that as the particles in immediate contact with the heated metal surface become softened and fused onto such surface fresh particles are brought into contact with the coating constituted of such previously fused particles under such conditions as will insure rapid heat transference to the fresh particles so as to bring their temperature above the fusing point of the polymer so that they too will become fused and form a part of the coating. This action continues so long as additional particles are brought to the surface of the previously formed coating under conditions insuring rapid heat transference between the added particles and the previously formed coating and the temperature of that coating and the underlying metal surface remains sufficiently high to cause the added particles to fuse and coalesce with the underlying coating.

The conditions whereby the desired rapid heat transfer from the heated metal surface directly to adjacently disposed solid particles of the ethylene polymer or indirectly through the coating that has previously formed in the course of the application of the powder may be brought about in various ways. We have found that the provision of a substantial excess of the ethylene polymer powder in superimposed relation upon the surface undergoing coating is desirable, but merely providing an excess of powder and allowing the powder to remain quiescent and the metal surface stationary beneath it will not insure the desired result.

According to one method of applying the powder in the coating of the interior surfaces of steel drums, a drum closed at one end and heated to a suitable temperature was filled about half full with polyethylene powder and then tipped to an inclined position and rotated. The angle of inclination chosen was one which would insure that the powder in the course of the rotation would become distributed throughout the length of the drum with some of the excess discharging from the open end. As the drum was rotated, the heated surface travelled beneath and in contact with the body of polyethylene powder producing what might be described as a wiping action between the lowermost particles of the polyethylene powder and the heated surface of the drum, thereby increasing the opportunity for heat transfer from the drum to the particles and causing the particles as they became fused to distribute in the form of a more or less uniform coating upon the heated metal surface. This action continues between the outer surface of the coating as it builds up and the solid particles of polymer that are constantly being brought into contact with it during the rotation of the drum.

According to another method of applying the powder, in this case the application being made to a five-gallon sheet metal pail, the pail, after having been preliminarily heated to a temperature of 450° F., was removed from the oven at that temperature and immediately filled with polyethylene powder. After a brief interval of standing to permit the particles directly in contact with the walls of the pail to become fused, additional portions of the polyethylene powder disposed in the pail were forcibly brought into contact with the heated walls by manually pressing outwardly from the interior of the body of particles towards and along the side walls so as to bring additional solid particles into efficient heat transferring relation to the previously formed coating and to cause these additional particles as they become fused to become attached to and form a part of the coating.

When the thickness of the coating of fused particles has been built up to the desired degree or the temperature of the metal has dropped to the point where fusion of additional particles at the outer side of the coating will not take place, the coating operation is discontinued and the coated article is separated from the excess of ethylene polymer powder which is then recovered for use in a subsequent coating operation.

The application of the ethylene polymer powder to the surfaces to be coated in quantities in substantial excess of those required for the desired thickness of the coating serves the added function of retarding the dissipation of heat from the metal article that is undergoing the coating treatment. This occurs because the excess of ethylene polymer powder acts to shield the underlying more highly heated particles of the ethylene polymer and the metal surface itself from convection currents of air that would otherwise flow directly over the heated metal surface or the softened and at least partially fused particles of the polymer that are directly in contact with such surface. The provision of an excess of the ethylene polymer powder also insures a more effective transfer of heat from the preheated metal surface to those particles of the ethylene polymer that are being brought up to the softening or fusing temperature for incorporation into the desired coating, both those that are in direct contact with the metal surface and those that are removed therefrom but which are intended ultimately to be incorporated into the coating.

The provision of an excess of ethylene polymer powder in superimposed relation to the particles that are being incorporated into the coating serves the further useful function that pressure may be applied to the outer surfaces of the layer including such excess particles and transmitted through the unsoftened excess particles to the underlying particles to hasten their incorporation into the fused coating without bringing the pressure applying means into direct contact with the softened and partially fused particles of the coating.

4. *Fineness of the ethylene polymer powder.*—The fineness and shape of the particles of the ethylene polymer are found to have some bearing on the rate at which a coating may be built up with the metal preheated to a given temperature, and, therefore, these factors should be taken into consideration in selecting the optimum preheating temperature. For example, it is found that sheet metal of a given thickness should be brought to a somewhat higher degree of preheat the coarser the average particle size of the ethylene polymer powder. It is also found that the fusion of the particles into a continuous coating proceeds more rapidly when the particles are generally spherical in shape as compared with the type of ethylene polymer powder in which the particles are more or less triangular and irregular in shape. Best results have been obtained with the use of ethylene polymer stated by the manufacturer to have a molecular weight of approximately 19,000 and showing on screen analysis a fineness of 100% through a 40 mesh sieve, 85% through a 50 mesh sieve, and approximately 50% through an 80 mesh sieve. The particles of this powder were characteristically spherical or rounded in shape.

Satisfactory results have also been obtained in using an ethylene polymer of another manufacturer stated to have a molecular weight of approximately 18,000 and having a fineness of 100% through a 20 mesh sieve with the bulk of the particles passing a 50 mesh sieve.

Both of ethylene polymers powders mentioned above softened or fused at about 212° F.

5. *Baking.*—After the coating operation the coated drum or other metal article is subjected to a baking treatment which is preferably carried on in an oven which permits continuous movement of the articles therethrough. This treatment is designed to bring about complete fusion of any solid particles adhering to the underlying coating and to smooth out any irregularities in the thickness of the coating in the surface portions thereof. This smoothing-out action is enhanced if the article is rotated in the course of the baking treatment, as by causing the coated drum to roll slowly by gravity through the oven. Under these conditions any pinholes that might have remained from the coating operation will have been removed.

In addition to the smoothing out of the coating, the baking treatment serves to harden the surfaces of the coating. This hardening action is apparently enhanced to some extent by the presence of oxygen in the oven atmosphere. It is known that thin ethylene polymer films, not exceeding one mil in thickness, may be hardened and given a high scratch resistance by a baking treatment carried on at about 400 to 475° F. and we make no claim that any novelty, broadly speaking, resides in the baking step of our process. However, it does not appear that it was previously considered to be possible to develop satisfactory adherence and scratch resistance by a baking treatment applied to a relatively thick coating. Coatings formed from solid particles of ethylene polymers by our coating method and having a thickness of from 8 mils to as high as 30 mils show, after a baking treatment applied on conclusion of the coating step, entirely satisfactory properties as regards adherence, freedom from pinholes, scratch resistance and resistance to chemicals. It will be observed that under the conditions which prevail in the course of the coating step, a certain amount of air is present in the voids between the solid particles of polymer and thus may come into direct contact with the freshly fused particles under the temperature conditions prevailing in the coating step. Likewise, in the case where the metal surface undergoing coating is periodically moved out of contact with the body of solid particles, as in the rotation of a partially filled, inclined drum, air is freely accessible to the freshly coated surface during such intervals. Since the temperature conditions that prevail in the course of the coating step, or at least nearly up until the end thereof, are such as to induce the baking or hardening of the fused polymer in the presence of air, it will be understood that we accomplish a large part of the baking or hardening reactions in the coating during the course of the coating step so that in the final baking step only a relatively minor portion of the thickness of the coating that is adjacent the surface needs to undergo the desired hardening reactions that are characteristic of a baking treatment.

We prefer to carry out the final baking step in an oven in which the temperature is maintained at about 400° F. The duration of the baking treatment at such temperature may be varied from 15 to 40 minutes depending on the thickness or mass of the article or shape undergoing the treatment. For sheet metal drums, pails and other metal articles of similar wall thickness we prefer that the duration of the baking treatment shall not exceed 20 minutes at the above temperature. If a somewhat higher temperature is employed in baking the coating the duration of the treatment should be shortened. It will be understood that the factors of optimum temperature and duration of the treatment will vary to some extent depending upon the thickness or mass of the metal carrying the coating which is undergoing the baking treatment, and care must be taken not to operate at a higher temperature for a sufficient length of time to produce charring or other undesired decomposition of the polymer.

6.—*Quenching.*—It is found that the adherence of the coating to the metal surface appears to be further enhanced by subjecting the coated metal surface to accelerated cooling as it leaves the baking oven. The accelerated cooling may be brought about by applying an air blast or preferably a water spray directly to surfaces of the metal article adjacent to those upon which the coating has been applied so as to reduce the temperature of the metal underlying the coating more rapidly than the coating itself cools off. For example, in coating the inside surfaces of a metal drum the cooling spray is applied to the outside of the drum. Although as above stated it is preferable to employ the quenching step, it will be understood that this is not essential to a satisfactory result, and the invention is not to be deemed as limited in this respect.

Following the baking step, or the baking and quenching steps when the latter is also employed, it is customary in our practice to subject the coating to a spark test with 15,000 volts of electricity to insure freedom from porosity. The linings prepared by our process have also been successfully tested for their resistance to a wide variety of chemicals including hydrochloric acid, fluoroboric acid, quaternary ammonium compounds, various detergents, dyestuffs, sodium hypochlorite solutions, hydrofluoric acid, wetting agents, nitric acid, sodium hydroxide, ammonium hydroxide, sulphuric acid and many other edible and non-edible products.

Referring more particularly to the drawings, there is shown in Fig. 1 a layout of the successive stations in a typical application of our process in the coating of the interior walls of steel drums. Legends have been applied to indicate generally the operations conducted at the various stations. These are more particularly described in the preceding description.

Figure 2:
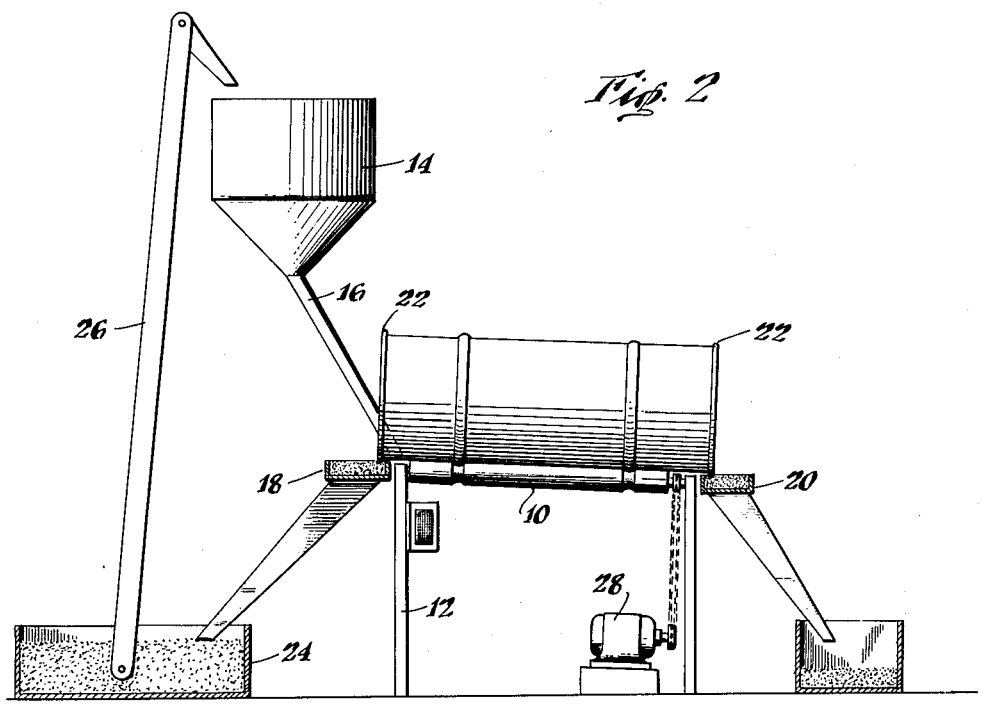
Fig. 2 is a side elevation of an apparatus used in carrying out the coating step in coating the interior surface of a steel drum to which the ends have not as yet been applied.

According to the modification of the coating apparatus shown in Fig. 2, a pair of driven rollers 10 mounted on a supporting frame 12 serve to support the open-ended shell of a steel drum in a position slightly inclined to the horizontal. A feed hopper 14 is disposed adjacent the upper end of the drum with a spout 16 positioned to discharge within that end of the drum. Overflow troughs 18 and 20 are provided at the opposite ends of the drum in position to receive the excess of the ethylene polymer powder that will pass out the opposite ends of the drum shell as the coating operation proceeds. It will be observed that these troughs on their respective inner sides extend inwardly of the ends of the drum so as to provide a quantity of the ethylene polymer in a position at each end of the drum where it will come into contact with the outwardly projecting flanges or lips 22 on the ends of the drum. These lips are heated and rotate in contact with the powder filling the troughs. Consequently, a polyethylene coating will build up on the outer surfaces of these lip portions in a similar manner as the coating is formed inside the drum. After the troughs 18 and 20 have become filled with the powder any further excess is permitted to discharge to a sump 24 from which it is elevated to the top of the feed hopper by suitable conveying means 26. As shown the rollers are positively driven by the motor 28.

In the modification of Figs. 3 and 4 the drum 10' is shown as closed at one end, i. e., at 30, and is mounted on two pairs of longitudinally spaced rollers 32 which are in turn supported in frame members 34. The drum having previously been preheated to the desired degree and then partially filled with the ethylene polymer powder is shown as placed upon the rollers with the open end inclined slightly downwardly from the horizontal. The drum is rotated on the rollers in any suitable manner, and, as shown at 36, the powder will feed out in the course of the rotation of the drum discharging into the receptacle 38 from which it may be withdrawn for reuse. As shown at 40 a movable hopper may be interposed between the receptacle 38 and the outlet of the drum in a position to receive the powder flowing out of the open end and retain a desired quantity of the powder in a position where it will be brought into contact with the outwardly turned lip 22' on the open end of the drum. In the same way as described in connection with the operation disclosed in Fig. 2 the lip will become coated through fusion of portions of the ethylene polymer powder held in contact therewith by the hopper 40.

The process has been described with particular reference to the coating of sheet steel containers of various kinds, and the coating of such containers constitutes a presently preferred application of the process. However, it will be understood that the process lends itself to the coating of various other types of articles either after they have been completely fabricated or are in an intermediate stage of manufacture. Similarly the process is applicable to the coating of steel and other metals in the form of sheets, strips or plates. The process can also be applied in coating various non-ferrous metals, including, for example, copper, aluminum, tin, zinc and brass.

We claim:

1. A process of forming an adherent relatively thick protective polyethylene coating upon a metal surface which comprises: introducing into contact with a preheated metal surface a mass of solid discrete particles of polyethylene substantially in excess of that required to form the desired thickness of coating, said metal surface being at a temperature of from 350° to 475° F.; applying force to said mass of polyethylene to press said polyethylene particles of said mass toward and along said surface, thereby producing a wiping action of the polyethylene particles immediately adjacent said surface upon said surface and fusing said particles to said surface to form a coating; continuing the application of said force until the temperature of the metal surface has dropped below the point where further build up of said coating through fusion and adherence of said particles will take place; removing the excess of said polyethylene particles and subjecting the resulting coated surface to a baking heat treatment to complete the adhesion and conversion of said coating to a firmly adherent and impermeable coating.

2. A process of forming an adherent, relatively thick polyethylene coating upon a metal surface which comprises: introducing into contact with a preheated metal surface a mass of solid, discrete particles of polyethylene substantially in excess of that required to form the desired thickness of coating, said surface being at a temperature of from 350° to 475° F.; applying force to said mass of polyethylene to press the individually discrete particles of said mass toward and along said surface, thereby producing a wiping action of the polyethylene particles immediately adjacent said surface upon said surface and fusing said polyethylene particles to said surface to form a coating; continuing the application of said force until the temperature of the metal surface has dropped below the point where further build up of said coating through fusion and adherence of said particles will take place; removing the excess of said polyethylene particles and subjecting the resulting coated metal surface to a heating treatment at a temperature of about 400° F. for from 15 to 40 minutes to complete adhesion and conversion of said coating to a firmly adherent and impermeable coating.

3. A process of forming an adherent, protective polyethylene coating of from 8 to 30 mils thickness upon a metal surface which comprises: introducing into contact with a preheated metal surface an amount of solid, discrete particles of polyethylene substantially in excess of that required to form the desired thickness of coating, said surface being at a temperature in the range 350°–475° F.; applying force to said mass of polyethylene to press the polyethylene particles of said mass towards and along said surface and thereby producing a wiping action of the polyethylene particles immediately adjacent said surface upon said surface and fusing said polyethylene particles to said surface to form a coating; continuing the application of said force until the temperature of the metal surface has dropped below the point where further build up of said coating through fusion and adherence of said particles will take place; removing the excess of said polyethylene particles and subjecting the resulting coated surface to heat treatment at a temperature of about 400° F. for from 15 to 40 minutes to complete the adhesion and conversion of said coating to a firmly adherent and impermeable coating.

4. A process of forming an adherent, relatively thick protective polyethylene coating of from 8 to 30 mills thickness upon a metal surface which comprises: introducing into contact with a preheated metal surface a mass of solid, discrete particles of polyethylene substantially in excess of that required to form the desired thickness of coating, said surface being at at temperature in the range 350° F.–475° F., said polyethylene particles having a molecular weight of about 19,000 and a fineness such that about 50% of the particles will pass through an 80 mesh sieve and all particles will pass through a 40 mesh sieve; maintaining said metal surface covered by said polyethylene particles; applying force to said polyethylene particles to press the polyethylene particles toward and along said surface, thereby producing a wiping action of the polyethylene particles immediately adjacent said surface upon said surface and fusing said polyethylene particles to said surface to form a coating; continuing the application of said force until the temperature of the metal surface has dropped below the point where further build up of said coating through fusion and adherence of said particles will take place; removing the excess of said polyethylene particles and subjecting the resulting coated surface to heat treatment at a temperature of about 400° F. for from 15 to 40 minutes in order to complete the adhesion and conversion of the coating to a firmly adherent and impermeable coating.

5. A process of forming an adherent, relatively thick protective polyethylene coating which comprises: introducing into contact with a preheated surface a mass of solid, discrete particles of polyethylene substantially in excess of that required to form the desired thickness of coating, said surface being at a temperature sufficient to cause polyethylene particles in contact with said surface to fuse and adhere thereto without accompanying thermal decomposition of said polyethylene; applying force to said mass of polyethylene to press the polyethylene particles of said mass toward and along said surface, thereby producing a wiping action of the polyethylene particles immediately adjacent said surface upon said surface and fusing said polyethylene particles to said surface to form a coating; continuing the application of said force until the temperature of the metal surface has dropped below the point where further build up of said coating through fusion and adherence of said particles will take place; removing the excess of said polyethylene particles and subjecting the resulting coated surface to a baking heat treatment to complete the adhesion and conversion of the coating to a firmly adherent and impermeable coating.

6. A process of forming an adherent, relatively thick protective polyethylene coating which comprises: introducing into contact with a preheated surface a mass of solid, discrete particles of polyethylene substantially in excess of that required to form the desired thickness of coating, said surface being at a temperature sufficient to cause said polyethylene particles in contact with said surface to fuse and adhere thereto without accompanying thermal decomposition of said polyethylene; applying force to said mass of polyethylene to press the polyethylene particles of said mass toward and along said surface, thereby producing a wiping action of the polyethylene particles immediately adjacent said surface upon said surface and fusing said polyethylene particles to said surface to form a coating; continuing the application of said force until the temperature of the metal surface has dropped below the point where further build up of said coating through fusion and adherence of said particles will take place; removing the excess of said polyethylene particles and subjecting the resulting coated surface to a baking heat treatment to complete the adhesion and conversion of the coating to a firmly adherent and impermeable coating, and suddenly cooling the resulting heat treated coated surface.

7. A process of forming an adherent, relatively thick polyethylene coating which comprises: introducing into contact with a pre-heated surface a mass of solid, discrete particles of polyethylene substantially in excess of that required to form the desired thickness of coating, said surface being at a temperature sufficient to cause fusion of said polyethylene particles in contact with said surface without accompanying thermal decomposition of said polyethylene particles; causing a force to be applied to the polyethylene particles immediately adjacent said surface, said force acting upon said particles toward and along said surface and thereby producing a wiping action of the polyethylene particles immediately adjacent said surface upon said surface and fusing said polethylene particles to said surface, and continuing the action of said force until the temperature of the metal surface has dropped below the point where further build up of said coating through fusion and adherence of said particles will take place, and thereafter removing the excess of unadhered individually discrete polyethylene particles.

8. The process of forming an adherent polyethylene coating on the inner surfaces of steel drums, pails and similar open-ended metal containers which comprises preheating the container to a temperature of from 350 to 475° F., then while the container remains heated within said temperature range filling it about halfway full with a quantity of individually discrete solid particles of polyethylene, said quantity being in substantial excess of the amount required to produce the predetermined thickness of coating, and thereupon rotating said container in an inclined position so as to bring portions of said polyethylene particles into contact with all of the interior surfaces of said container, thereby inducing fusion of said particles and adherence thereof to said surfaces, continuing said rotating action to build up the thickness of the coating of fused particles on said container surfaces, thereafter removing the excess of comminuted polyethylene that has not become adhered to the container surfaces, and then subjecting said container to a baking heat treatment to complete the adhesion and conversion of said coating to a firmly adherent impermeable and insoluble form.

9. The process of forming and building up on a metal surface in a single coating operation a relatively thick adherent protective polyethylene coating which comprises covering the metal surface while it is heated to a temperature of from 350 to 475° F. by a mass of individually discrete solid particles of polyethylene of a volume substantially in excess of that required to form the desired thickness of coating thereon, pressing said mass of particles upon said heated metal surface with a wiping action to cause particles of said mass that are in contact with said surface to fuse and adhere thereto, continuing said pressing and wiping action to bring additional particles of said mass into contact with said metal surface and build up the coating thereon until the temperature of the metal surface has dropped below the point where further build up of said coating through fusion and adherence of said particles will take place, thereafter removing the excess of unadhered polyethylene particles and subjecting the coated metal surface to a baking heat treatment to complete the adhesion and conversion of said coating to a firmly adherent, impermeable and insoluble form.

10. A process of forming an adherent, relatively thick protective polyethylene coating upon a metal surface which comprises: introducing into contact with a heated metal surface a mass of solid, discrete particles of polyethylene substantially in excess of that required to form a desired thickness of coating, maintaining said surface at a temperature sufficient to cause polyethylene particles in contact with said surface to fuse and adhere thereto without accompanying thermal decomposition of said polyethylene; applying said mass of polyethylene particles downwardly under the force of gravity toward and along said surface, thereby producing a wiping action on the polyethylene particles immediately adjacent said surface upon said surface and fusing said polyethylene particles to said surface to form a coating; and separating said excess of polytheylene particles from said surface.

References Cited in the file of this patent

UNITED STATES PATENTS

| | | |
|---|---|---|
| 1,577,531 | Lambert et al. | May 23, 1926 |
| 1,736,915 | Illemann et al. | Nov. 26, 1929 |
| 1,755,634 | Dewey | Apr. 22, 1930 |
| 2,197,742 | Burk | Apr. 16, 1940 |
| 2,340,452 | Child et al. | Feb. 1, 1944 |
| 2,350,856 | Woitscheck | June 6, 1944 |
| 2,421,975 | Williams | June 10, 1947 |

FOREIGN PATENTS

| | | |
|---|---|---|
| 566,745 | Great Britain | Jan. 11, 1945 |
| 571,867 | Great Britain | Sept. 21, 1945 |
| 574,309 | Great Britain | Dec. 31, 1945 |
| 585,395 | Great Britain | Feb. 6, 1947 |